April 3, 1962  H. MITTAG  3,028,537
GENERATOR INSTALLATION
Filed April 5, 1960

INVENTOR
Hermann Mittag
by Michael S. Striker
Attorney

United States Patent Office 3,028,537
Patented Apr. 3, 1962

3,028,537
GENERATOR INSTALLATION
Hermann Mittag, Stuttgart-Botnang, Germany, assignor to Robert Bosch G.m.b.H., Stuttgart, Germany
Filed Apr. 5, 1960, Ser. No. 20,202
Claims priority, application Germany Apr. 11, 1959
17 Claims. (Cl. 322—25)

The present invention concerns generator installations, and more particularly such installations which are suitable for being used as a lighting power plant for vehicles, particularly motor vehicles. Such generator installations contain a shunt-wound generator and a regulating device for regulating the output of the generator. The regulating device may comprise regulating means, preferably transistor means, connected in series with the exciter winding of the generator.

One purpose and function of the regulating device is to keep the output voltage of the generator at a substantially constant level irrespective of the varying rotary speeds of the generator and irrespective of the magnitude of the load current delivered by the generator. However, as a second function, the regulating device should be capable of preventing an overload of the generator by substantially reducing the regulated output voltage whenever the load current approaches the value which would be detrimental or dangerous for the operation of the generator.

It has been proposed to arrange in the output circuit of the generator which services for instance a storage battery and other current consumers connected therewith, a control resistor through which the entire load current of the generator is caused to flow. It is then possible to utilize the voltage drop appearing across such a resistance, for blocking the regulating transistor connected in series with the exciter winding of the generator so as to substantially reduce the voltage output of the generator. However, it has been found, that for such an operation of the regulating device usually comparatively high values of voltage drop caused by the output current will be required unless multi-stage amplifiers are used for amplifying such voltage drop, which is undesirable. In addition, the heat produced in the above mentioned resistor affects transistors used in the regulating device unless special steps are taken for compensating the effect of raised temperatures.

It is therefore a main object to overcome the above mentioned drawbacks and to provide a generator installation including regulating means of comparatively simple and durable construction.

With above objects in view, a generator installation, according to the invention comprises, in combination, a generator having a shunt exciter winding; regulating means in circuit with said exciter winding for varying the flow of exciter current through said exciter winding depending upon the application of a control voltage to said regulating means; semiconductor means capable of deriving, from a primary voltage applied thereto, an auxiliary voltage varying with the magnitude of a magnetic field applied to said semiconductor means; means for applying said primary voltage to said semiconductor means; circuit means for deriving, from said auxiliary voltage, said control voltage and for applying the same to said regulating means for causing the latter to vary said flow of exciter current through said exciter winding; and field means connected in the output circuit of said generator for producing a magnetic field by means of the output current of said generator and for applying said magnetic field to said semiconductor means for varying said auxiliary voltage depending upon variations of said output current.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 1:
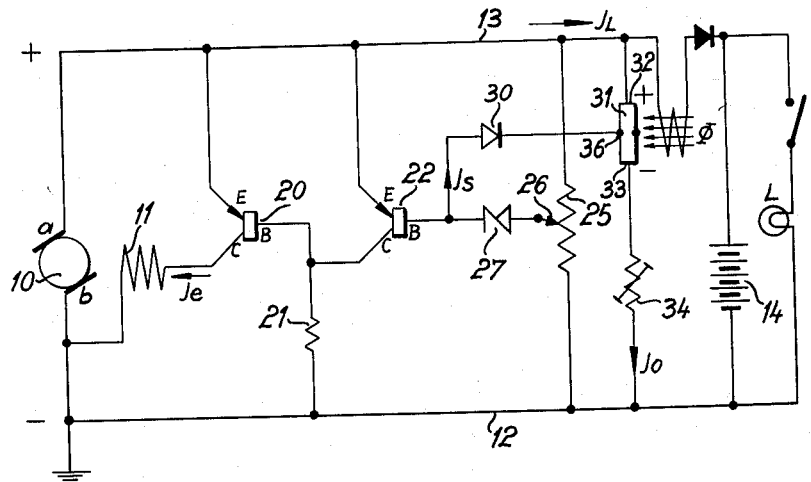
FIG. 1 is a schematic circuit diagram of one embodiment of the invention.

The generator installation according to FIG. 1 contains a direct current generator 10 having a shunt exciter winding 11. One end of the exciter winding 11 together with the grounded minus output line 12 of the generator is connected with the one brush or terminal $b$ of the generator. From the other terminal or brush $a$ of the generator the plus output line 13 leads to a storage battery 14 connected between the lines 12 and 13 and, on the other hand, connected with current consuming installations of which one lamp L is shown by way of example.

The regulating means of the embodiment shown in FIG. 1 comprises a regulating transistor 20 of the p-n-p-type, the collector electrode C of which is connected with the free end of the exciter winding 11. The base B of the transistor 20 is connected via a resistor 21 with the negative output line 12. In addition, the base B of the transistor 20 is connected with the collector of a control transistor 22 the emitter E of which is connected, in the same manner as the emitter E of the transistor 20, with the positive output line 13. For the purpose of voltage regulation a voltage divider 25 is connected across the output circuit i.e., between the lines 12 and 13, and the movable tap 26 of this voltage divider 25 is connected via a Zener diode 27 with the base of the control transistor 22. A crystal diode, preferably a silicon diode 30 is connected between a junction point located between the diode 27 and the transistor 22, on one hand, and the tap electrode 36 of a semiconductor device 31 which operates on the basis of the Hall principle i.e., at a variable conductivity depending upon variations of the magnetic field applied thereto. The positive control electrode 32 of the device 31 is directly connected with the positive line 13, while its negative control electrode 33 is connected via a resistor 34 with the negative output line 12. The resistor 34 is adjustable but will usually be set for a predetermined resistance value. Conventional semiconductor devices of the type mentioned have two voltage electrodes, but in the present application only the negative electrode 36 is utilized and connected with the silicon diode 30, while the other voltage electrode is left unconnected.

For controlling the semiconductor device 31 an electromagnetic field Φ is provided. This field is produced by the load current $J_L$ delivered by the generator and flowing through the positive line 13 toward the battery 14 or the installation L. FIG. 1 illustrates in what manner the electromagnetic field acts on the device 31.

Figure 2:
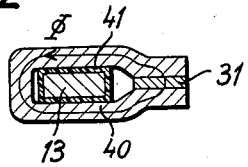
FIG. 2 is a cross sectional view at a larger scale of one component of the arrangement of FIG. 1 and applies analogously also to FIG. 3.

FIG. 2 illustrates in greater detail the structure of the just-mentioned device. A straight portion of the conductor 13, having preferably rectangular cross section is surrounded by a soft iron yoke member 40 as shown. The yoke 40 may be produced advantageously from a strip of soft iron bent to the desired shape. A thin layer of insulating material 41 may be interposed between the conductor 13 and the yoke 40. The free ends of the yoke 40 are formed to be spaced from each other a small distance of approximately .2 mm. and the semiconductor material 31 is inserted into this space. It will be readily understood that direct current flowing through the conductor 13 will produce a magnetic field around the conductor whereby a magnetic flux is set up in the yoke member as intimated by the arrow. Thus, when current flows through the conductor 13 the semiconductor 31 is exposed to the magnetic flux and thereby to the magnetic field produced by the current.

The automatic voltage regulation is carried out in the following manner. The regulating transistor 20 remains in conductive condition from the start of the operation of the generator 10 until the output voltage of the generator reaches a predetermined value. When this condition is reached the Zener diode 27 becomes conductive and causes the control transistor 22 which up to this moment has been non-conductive, to become also conductive. Now the control transistor 22 is capable of carrying the current flowing through the resistor 21 and causing across this resistor 21 a voltage drop of such a magnitude that the remaining voltage difference between the emitter and the base of the regulating transistor 20 is not sufficient anymore for holding the regulating transistor 20 in its conductive condition. Consequently, the exciter current $J_E$ flowing through the exciter winding 11 is bound to decrease rapidly so that the output voltage of the generator decreases likewise. Since the control transistor 22 has a comparatively great amplification factor, already a very minute decrease of the generator output voltage below its predetermined normal value will suffice for blocking the control transistor 22 because under these circumstances the Zener diode 27 becomes again non-conductive. At the same time and as a result of that the regulating transistor 20 is again rendered conductive so that the just described cycle of operations can start again and repeat.

Independently of the above described voltage regulation an automatic limitation of the output current $J_L$ to a predetermined maximum value depending on the particular data of the generator or other factors is obtained according to the invention in the following manner.

As long as the output current $J_L$ is very small the potential available at the minus electrode 36 of the semiconductor device 31 is kept by the current $J_O$ flowing through the device 31 and the series connected resistor 34 at a level which is about .4 volt below the potential existing in the positive output line 13. However, since the silicon diode 30 has a comparatively high threshold voltage and does not become conductive before a potential difference of .7 volt appears between the electrodes of this diode 30, no control current can flow at this moment from the base of the control transistor via the silicon diode 30 to the minus electrode of the semiconductor device 31. This can occur only when the output current $J_L$ produces a magnetic field $\Phi$ of such a magnitude that the voltage produced between the not marked positive electrode and the minus electrode 36 of the device 31 by the magnetic field in accordance with the Hall principle reaches a value of at least .3 volt. Under this condition the threshold value of the silicon diode 30 is exceeded and the control current $J_s$ now flowing across the diode 30 renders the transistor 22 conductive even when the output voltage of the generator is below its predetermined normal value. In this manner a reduction of the output voltage is obtained as soon as the output current $J_L$ reaches its predetermined maximum value.

Figure 3:
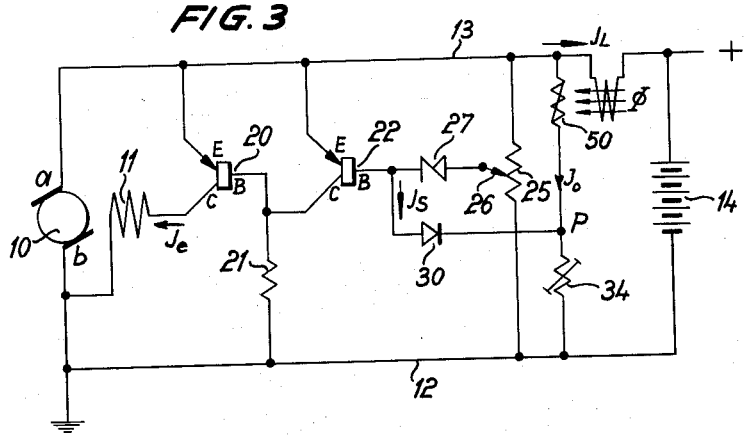
FIG. 3 is another embodiment of the invention.

The embodiment according to FIG. 3 is generally similar to that of FIG. 1 and therefore all equal components are designated with the same reference numerals and letters. The main difference between the two embodiments is the arrangement of the semiconductor device 50 as a series resistance connected with the resistor 34 between the output lines 12 and 13 in the manner of a voltage divider, the output voltage of the generator being applied to the outer ends of this series combination. The semiconductor device 50 in this embodiment is exposed to the influence of a magnetic field produced by the output current $J_L$ in the same manner as in FIG. 1. Also in this example the comparatively high threshold value of the silicon diode 30 prevents a control current $J_s$ from flowing from the base of the control transistor 22 to the junction point P between the semiconductor device 50 and the fixed resistance 34, as long as the output current $J_L$ is below a predetermined permissible maximum value. Only when the conductivity of the semiconductor 50 is reduced due to increasing strength of the magnetic field caused by a corresponding increase of the output of the current, the control current $J_s$ is capable of flowing through the silicon diode 30 and thereby cause blocking of the regulating transistor 20 to such as extent that the generator output voltage decreases substantially below its normal value.

It will be understood that each of the elements described above or two or more together, may also find a useful application in other types of generator installation differing from the types described above.

While the invention has been illustrated and described as embodied in a generator installation containing a generator having a shunt exciter winding, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a generator installation, in combination, a generator having a shunt exciter winding; regulating means in circuit with said exciter winding for varying the flow of exciter current through said exciter winding depending upon the application of a control voltage to said regulating means; semiconductor means capable of deriving, from a primary voltage applied thereto, an auxiliary voltage varying with the magnitude of a magnetic field applied to said semiconductor means; means for applying said primary voltage to said semiconductor means; circuit means for deriving, from said auxiliary voltage, said control voltage and for applying the same to said regulating means for causing the latter to vary said flow of exciter current through said exciter winding; and field means connected in the output circuit of said generator for producing a magnetic field by means of the output current of said generator and for applying said magnetic field to said semiconductor means for varying said auxiliary voltage depending upon variations of said output current.

2. In a generator installation, in combination, a generator having a shunt exciter winding; regulating transistor means in circuit with said exciter winding for varying the flow of exciter current through said exciter winding depending upon the application of a control voltage to said regulating transistor means for varying its conductivity; semiconductor means capable of deriving, from a primary voltage applied thereto, an auxiliary voltage varying with the magnitude of a magnetic field applied to said semiconductor means; means for applying said primary voltage to said semiconductor means; circuit means for deriving, from said auxiliary voltage, said control voltage and for applying the same to said regulating transistor means for causing the latter to vary said flow of exciter current through said exciter winding; and field means connected in the output circuit of said generator for producing a magnetic field by means of the output current of said generator and for applying said magnetic field to said semiconductor means for varying said auxiliary voltage depending upon variations of said output current.

3. In a generator installation, in combination, a generator having a shunt exciter winding; regulating transistor means in circuit with said exciter winding for varying the flow of exciter current through said exciter winding depending upon the application of a control voltage to said regulating transistor means for varying its conductivity; semiconductor means capable of deriving, from a primary voltage applied thereto, an auxiliary voltage varying with variation of its conductivity depending on the magnitude of a magnetic field applied to said semiconductor means; means for applying said primary voltage to said semiconductor means; circuit means for deriving, from said auxiliary voltage, said control voltage and for applying the same to said regulating transistor means for causing the latter to vary said flow of exciter current through said exciter winding; and field means connected in the output circuit of said generator for producing a magnetic field by means of the output current of said generator and for applying said magnetic field to said semiconductor means for varying said auxiliary voltage depending upon variations of said output current.

4. In a generator installation, in combination, a generator having a shunt exciter winding; regulating transistor means in circuit with said exciter winding for varying the flow of exciter current through said exciter winding depending upon the application of a control voltage to said regulating transistor means for varying its conductivity; semiconductor means capable of deriving, from a primary voltage applied thereto, an auxiliary voltage varying with variation of its conductivity depending on the magnitude of a magnetic field applied to said semiconductor means, said semiconductor means being connected across the output circuit of said generator, for deriving said primary voltage from the generator output voltage in proportion to the latter; circuit means for deriving, from said auxiliary voltage, said control voltage and for applying the same to said regulating transistor means for causing the latter to vary said flow of exciter current through said exciter winding; and field means connected in the output circuit of said generator for producing a magnetic field by means of the output current of said generator and for applying said magnetic field to said semiconductor means for varying said auxiliary voltage depending upon variations of said output current.

5. In a generator installation, in combination, a generator having a shunt exciter winding; regulating transistor means in circuit with said exciter winding for varying the flow of exciter current through said exciter winding depending upon the application of a control voltage to said regulating transistor means for varying its conductivity; semconductor means capable of deriving, from a primary voltage applied thereto, an auxiliary voltage varying with variation of its conductivity depending on the magnitude of a magnetic field applied to said semiconductor means, said semiconductor means and resistor means being connected across the output circuit of said generator in series with each other, for deriving said primary voltage from the generator output voltage in proportion to the latter; circuit means for deriving, from said auxiliary voltage, said control voltage and for applying the same to said regulating transistor means for causing the latter to vary said flow of exciter current through said exciter winding; and field means connected in the output circuit of said generator for producing a magnetic field by means of the output current of said generator and for applying said magnetic field to said semiconductor means for varying said auxiliary voltage depending upon variations of said output current.

6. In a generator installation, in combination, a generator having a shunt exciter winding; regulating transistor means in circuit with said exciter winding for varying the flow of exciter current through said exciter winding depending upon the application of a control voltage to said regulating transistor means for varying its conductivity; semiconductor means capable of deriving, from a primary voltage applied thereto, an auxiliary voltage varying with variation of its conductivity depending on the magnitude of a magnetic field applied to said semiconductor means, said semiconductor means and variable resistor means being connected across the output circuit of said generator in series with each other, for deriving said primary voltage from the generator output voltage in proportion to the latter; circuit means for deriving, from said auxiliary voltage, said control voltage and for applying the same to said regulating transistor means for causing the latter to vary said flow of exciter current through said exciter winding; and field means connected in the output circuit of said generator for producing a magnetic field by means of the output current of said generator and for applying said magnetic field to said semiconductor means for varying said auxiliary voltage depending upon variations of said output current.

7. An installation as claimed in claim 5, wherein said semiconductor means is provided with a tap electrode for delivering said auxiliary voltage.

8. An installation as claimed in claim 5, wherein said series-connected semiconductor means and resistor means are connected as voltage divider means having a junction point therebetween where said auxiliary voltage is available.

9. An installation as claimed in claim 7, wherein said circuit means comprise voltage divider means connected across the generator output circuit for deriving a predetermined potential proportional to the generator output voltage, a Zener diode connected with one of its electrodes to a tap point of said voltage divider means, and a crystal diode connected between the other electrode of said Zener diode and said tap electrode of said semiconductor means.

10. An installation as claimed in claim 8, wherein said circuit means comprise voltage divider means connected across the generator output circuit for deriving a predetermined potential proportional to the generator output voltage, a Zener diode connected with one of its electrodes to a tap point of said voltage divider means, and a crystal diode connected between the other electrode of said Zener diode and said junction point between said semiconductor means and said resistor means.

11. An installation as claimed in claim 7, wherein said circuit means comprise voltage divider means connected across the generator output circuit for deriving a predetermined potential proportional to the generator output voltage, a Zener diode connected with one of its electrodes to a tap point of said voltage divider means, and a silicon diode connected between the other electrode of said Zener diode and said tap electrode of said semiconductor means.

12. An installation as claimed in claim 8, wherein said circuit means comprise voltage divider means connected across the generator output circuit for deriving a predetermined potential proportional to the generator output voltage, a Zener diode connected with one of its electrodes to a tap point of said voltage divider means, and a silicon diode connected between the other electrode of said Zener diode and said junction point between said semiconductor means and said resistor means.

13. An installation as claimed in claim 9, wherein said resistor means has a resistance causing, during the flow of a generator output current below a predetermined maximum permissible value thereof, a voltage drop across said semiconductor means within a range up to the characterstic threshold voltage of said crystal diode.

14. An installation as claimed in claim 10 wherein said resistor means has a resistance causing, during the flow of a generator output current below a predetermined maximum permissible value thereof, a voltage drop across said semiconductor means within a range up to the characterstic threshold voltage of said crystal diode.

15. An installation as claimed in claim 13, wherein said regulating transistor means has a collector, an emitter and a base electrode, said collector and emitter electrodes being connected in series between said exciter winding and one generator output terminal, and resistance means being connected between said base electrode and the other output terminal of said generator, and wherein a control transistor means is operatively connected with its emitter-collector circuit between said one generator output terminal and said base electrode of said regulating transistor means, the base of said control transistor means being connected with said other electrode of said Zener diode, said Zener diode being connected so as to block current from said base, said crystal diode being connected to permit passage of current from said base of said control transistor means.

16. An installation as claimed in claim 14, wherein said regulating transistor means has a collector, an emitter and a base electrode, said collector and emitter electrodes being connected in series between said exciter winding and one generator output terminal, and resistance means being connected between said base electrode and the other output terminal of said generator, and wherein a control transistor means is operatively connected with its emitter-collector circuit between said one generator output terminal and said base electrode of said regulating transistor means, the base of said control transistor means being connected with said other electrode of said Zener diode, said Zener diode being connected so as to block current from said base, said crystal diode being connected to permit passage of current from said base of said control transistor means.

17. In a generator installation, in combination, a generator having a shunt exciter winding; regulating means in circuit with said exciter winding for varying the flow of exciter current through said exciter winding depending upon the application of a control voltage to said regulating means semiconductor means capable of deriving, from a primary voltage applied thereto, an auxiliary voltage varying with the magnitude of a magnetic field applied to said semiconductor means; means for applying said primary voltage to said semiconductor means; circuit means for deriving, from said auxiliary voltage, said control voltage and for applying the same to said regulating means for causing the latter to vary said flow of exciter current through said exciter winding; and field means connected in the output circuit of said generator for producing a magnetic field by means of the output current of said generator and for applying said magnetic field to said semiconductor means for varying said auxiliary voltage depending upon variations of said output current, said field means comprising a substantially U-shaped soft iron yoke member surrounding one conductor portion of said output circuit, said semiconductor means being mounted between the free ends of said yoke member.

References Cited in the file of this patent
UNITED STATES PATENTS

| | | |
|---|---|---|
| 2,886,779 | Kuhrt et al. | May 12, 1959 |
| 2,957,109 | White et al. | Oct. 18, 1960 |